United States Patent [19]

Danna

[11] Patent Number: 5,052,437

[45] Date of Patent: Oct. 1, 1991

[54] VENT TUBE ASSEMBLY

[75] Inventor: Anthony J. Danna, Farmington, Mich.

[73] Assignee: Ford Motor Company, Dearborn, Mich.

[21] Appl. No.: 620,951

[22] Filed: Dec. 3, 1990

[51] Int. Cl.$^5$ ............................................. F16R 24/04
[52] U.S. Cl. ..................................... 137/587; 137/577; 137/590; 141/206; 141/288
[58] Field of Search ...................... 137/577, 577.5, 587, 137/590, 590.5, 591; 141/206, 288

[56] References Cited

U.S. PATENT DOCUMENTS

| 2,086,645 | 7/1937 | Staber | 73/290 R |
|---|---|---|---|
| 2,192,543 | 3/1940 | Dell | 184/1.5 |
| 2,313,382 | 3/1943 | Kistner | 38/77.83 |
| 2,682,356 | 6/1954 | Allen | 137/590 X |
| 2,917,068 | 12/1959 | Davis | 137/590 X |
| 3,420,281 | 1/1969 | Tidwell | 141/40 |
| 3,862,701 | 1/1975 | Strunc et al. | 220/227 |
| 4,114,783 | 9/1978 | Wempe et al. | 137/590 X |
| 4,219,047 | 8/1980 | Polley | 137/590 |
| 4,266,574 | 5/1981 | Tilling | 137/630.19 |
| 4,701,198 | 10/1987 | Uranishi et al. | 137/587 X |
| 4,717,032 | 1/1988 | Wu | 215/228 |
| 4,790,349 | 12/1988 | Harris | 137/587 |
| 4,890,646 | 1/1990 | Dumser | 137/590 |

Primary Examiner—John Rivell
Attorney, Agent, or Firm—Jerome R. Drouillard; Clifford L. Sadler

[57] ABSTRACT

A vent tube assembly (10) for use with a supply of fuel to a fuel tank (12) mounted in a vehicle (14), which enables an operator to fill the tank (12) with a reasonably predictable quantity of fuel to its normal capacity. The vent tube assembly (10) comprises an inner vent tube (24) having at least one inner venting port (26) defined therein. The inner vent tube (24) extends downwardly through the tank (12) for relieving vapor pressure in the tank as the volume of fuel contained therein increases during replenishment from the supply until the fuel in the tank rises to a shut-off level (30). An outer vent tube (32) lies in telescoping relationship with the inner vent tube (24) and has a base (34) which is received by the lower portion of the fuel tank. The outer vent tube (32) is provided with at least one outer venting port (36). A spring urges the outer vent tube (32) toward an extended position so that the outer vent tube (32) is loaded against the lower portion of the tank (12). The outer vent tube (32) is adapted to move in cooperation with the lower portion of the tank (12). The vent tube assembly (10) provides a fuel shut-off level (30) which is determined at a fixed distance above the lower portion of the fuel tank, regardless of dimensional changes therein and vehicle attitude.

20 Claims, 4 Drawing Sheets

VENT TUBE ASSEMBLY

TECHNICAL FIELD

The present invention relates generally to vent tube assemblies for use in the fuel tank of an automotive vehicle. More particularly, the present invention relates to a self-adjusting vent tube assembly which assists in determining a fuel shut-off level located at a fixed distance from a lower portion of the fuel tank, regardless of dimensional changes therein and the vehicle attitude.

BACKGROUND ART

Most motor vehicles which are propelled by an internal combustion engine typically include a fuel tank. Replenishment of fuel in the tank is usually achieved by inserting a pressure-sensitive nozzle which is in fluid communication with a filler pipe and a supply of fuel. Upon insertion of the pressure-sensitive nozzle into a fuel filler neck attached to the fuel tank, fuel is delivered from the filler pipe until fuel flow is arrested by an operator or by the fuel in the tank reaching a shut-off level.

After depletion of fuel during consumption by the internal combustion engine, the level of fuel rises as the tank is filled from the supply. As is well known, the space in the fuel tank above the surface of the liquid fuel becomes occupied by an amount of fuel vapor. To avoid unwanted build-up of fuel vapor pressure, a vent tube is typically provided which ducts fuel vapor from the fuel tank ultimately to the ambient atmosphere.

A fuel shut-off level is reached when the rising surface of fuel in the fuel tank is higher than the open end of the vent tube which extends into the fuel tank. Before reaching the fuel cut-off level, the amount of vapor pressure approximates ambient atmospheric pressure because of unobstructed relief through the vent tube. Beyond the fuel shut-off level, if more fuel were delivered into the fuel tank from the supply through the pressure-sensitive fuel filler pipe nozzle, the vapor pressure in the space above the fuel in the tank would rise, because the fuel vapor has no means of escape through the vent tube. In response to the build-up of fuel vapor pressure, the pressure-sensitive fuel filler pipe nozzle terminates the delivery of fuel into the tank.

One difficulty in implementing the aforesaid general design objectives lies in the unpredictable effect on fuel level of dimensional and shape changes in the fuel tank caused by temperature variations and mechanical deformation. The materials of which fuel tanks are made inherently possess coefficients of thermal expansion which produce dimensional changes in response to variations in ambient temperature. To meet crashworthiness standards and weight requirements imposed by regulatory authorities and the vehicle designer, contemporary fuel tanks are typically made of deformable, but thin materials. Consequently, dimensional changes in the fuel tank also result when the tank is affixed to the vehicle underbody by retaining straps. Such straps generally require tensioning in order to provide firm securement of the fuel tank to the vehicle underbody. Because of lack of rigidity in the fuel tank, the effect of such tensioning is to cause some buckling of the fuel tank walls.

One adverse result of such thermally and mechanically induced dimensional changes is that the location of the fuel cut-off level is altered. In extreme cases, the fuel cut-off level, defined by the highest point of the open end of the vent tube within the fuel tank, may be displaced downwardly toward the lower portion of the fuel tank if buckling occurs in the tank wall which supports the vent tube. As a result, the amount of useable fuel which an operator may add to the tank may be diminished significantly. In such cases, the amount of useable fuel in the fuel tank may be considerably below the tank's nominal capacity.

Thus, a causative factor involved in sub-optimal fuel replenishment is the linear or angular displacement of the fuel shut-off tube in response to thermally or mechanically-induced dimensional changes in the fuel tank. One manifestation of such displacement is that the amount of fuel in the tank which has risen to the fuel shut-off level is unpredictable. Not only may the operator be unable to fill the fuel tank to its nominal capacity, but the amount of fuel capable of being delivered to the engine, may often be unpredictable.

A system for controlling discharge of fuel vapor from the fuel tank is disclosed in U.S. Pat. No. 4,790,349. However, this reference does not confront the problems posed by unpredictable fuel shut-off levels.

SUMMARY OF THE INVENTION

The present invention solves the above problems and addresses related needs by providing a vent tube assembly for use with a supply of fuel which is adapted for delivery thereof to a fuel tank mounted in a vehicle. Conventionally, the fuel tank has a lower portion and an upper portion connected thereto. The fuel tank is provided with a filler neck into which may extend a pressure-sensitive filler nozzle in fluid communication with the supply. As is well known, the filler pipe is adapted for terminating delivery of fuel into the fuel tank when the vapor pressure therein exceeds a shut-off pressure.

The vent tube assembly comprises an inner vent tube with at least one inner venting port defined therein. The inner vent tube extends downwardly through the upper portion of the fuel tank for relieving vapor pressure therein as the volume of fuel increases during replenishment from the supply until the fuel in the tank rises to a fuel shut-off level. In telescoping relationship with the inner vent tube, there is provided an outer vent tube having a base which is received by the lower portion of the fuel tank. The outer vent tube is provided with at least one outer venting port defined therein.

To urge the outer vent tube downwardly so that it is seated upon the lower portion of the fuel tank, a spring is provided for cooperatively engaging the outer vent tube into registration with the lower portion of the fuel tank. The spring urges the outer vent tube toward an extended position so that it is biased toward the lower portion of the fuel tank, the outer vent tube remaining in facing relationship therewith, despite displacement thereof. As a result, the outer vent tube may move in cooperation with the lower portion of the fuel tank.

At least one outer venting port provided in the outer vent tube includes an upper outer venting port with an upper circumferential reference point. A fuel shut-off level is defined by a horizontal plane which extends through the upper circumferential reference point.

Accordingly, the fuel shut-off level is determined by a fixed distance above the lower portion of the fuel tank, regardless of dimensional changes therein and vehicle attitude. As a result, an operator may fill the fuel tank with a reasonably predictable quantity of fuel to its nominal capacity.

BEST MODE FOR CARRYING OUT THE INVENTION

Figure 1:
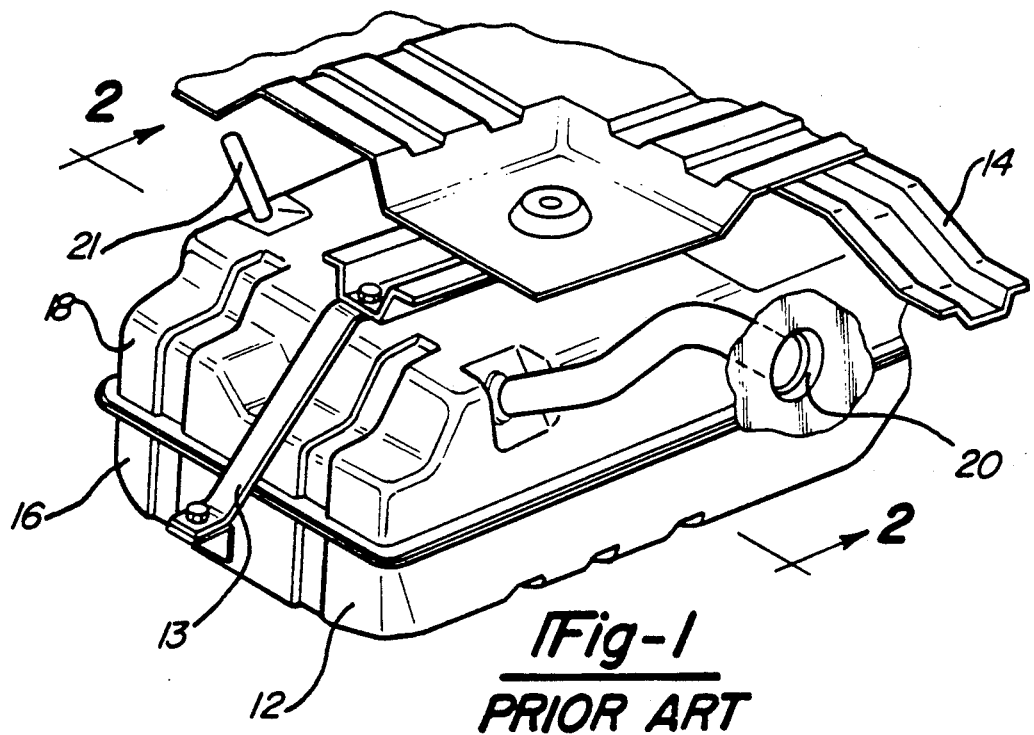
FIG. 1 is an environmental perspective view of a conventional fuel tank mounted in a vehicle, and shows a filler neck and a vent tube assembly extending into the fuel tank.

Referring first to FIG. 1, there is shown a fuel tank 12 mounted to the underbody of a vehicle 14. The fuel tank !2 has a lower portion 16 and an upper portion 18 connected thereto. In order to introduce fuel into the fuel tank 12, a filler neck 20 is provided in fluid communication with the fuel tank 12. As is well known, fuel is introduced from a supply thereof located outside the vehicle 14 through a pressure-sensitive filler nozzle (not shown) which is in fluid communication with the supply. Conventionally, the pressure-sensitive filler nozzle is adapted for terminating delivery of fuel into the fuel tank 12 when the vapor pressure therein exceeds a shut-off pressure.

Figure 2:
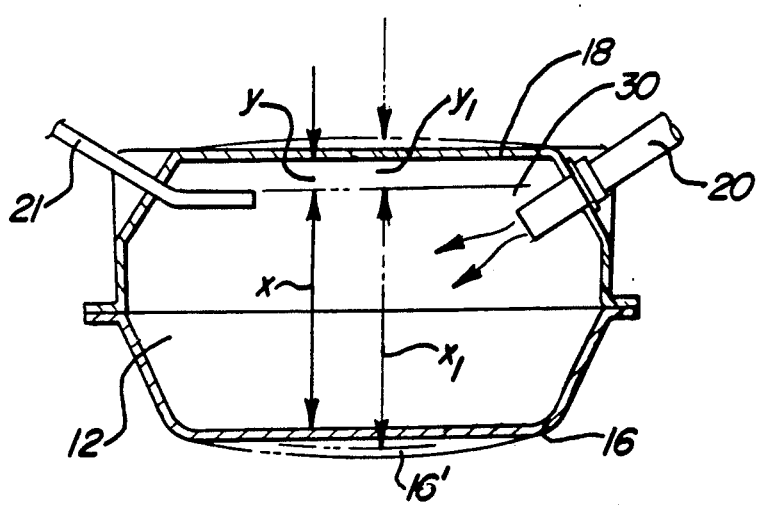
FIG. 2 is a cross-sectional view of the fuel tank taken along the line 2—2 of FIG. 1.

Referring now to FIGS. 1 and 2 taken together, there is depicted a vent tube 21 which may relieve any build-up of vapor pressure as fuel is introduced into the fuel tank 12 through the pressure-sensitive filler nozzle. Vapor escaping along the vent tube 21 is ultimately vented to the ambient atmosphere, either directly, or after passage through suitable filtering devices. Traditionally, the vent tube 21 also assures that a vacuum is not created in the tank as fuel is consumed by an engine in the vehicle 14. For simplicity, not shown in FIGS. 1 and 2, is a conventional fuel delivery pipe which ultimately ducts fuel from the fuel tank 12 to a carburetor and to the vehicle engine. Were it not for the vent tube 21, discontinuities in the flow of fuel to the engine would be likely to occur. Because of the vent tube 21, the vapor pressure above the fuel in the tank 12 is at all times substantially equal to ambient atmospheric pressure, thereby permitting a uniform flow rate of fuel to the engine.

Continuing now with primary reference to FIG. 2, there is shown a distance X between a lower portion 16 of the fuel tank 12 and a fuel shut-off level 30. The dimension Y represents the distance between the fuel shut-off level 30 and an upper portion 18 of the fuel tank 12.

To secure the fuel tank 12 to the vehicle 14, as shown in FIG. 1, support straps 13 are provided. As such straps become tightened, as shown in FIG. 2, the lower portion 16 of the fuel tank 12 may become buckled outwardly so that the lower portion 16 occupies a position represented by the reference numeral 16'. Corresponding distensions may also occur (not shown) in the sidewalls and in parts of the upper portion 18 of the fuel tank.

As the lower portion of the fuel tank 12 assumes a position represented by the reference numeral 16', in conventional designs, the distance of the lower portion 16' below the fuel shut-off level 30 may change from X to X1. Under this condition, other things being equal, more fuel can be introduced through the filler neck 20 into the fuel tank 12 then was possible without buckling, before the level of fuel rises to the fuel shut-off level 30. As a result, the quantity of fuel needed to "fill" the tank may be unpredictable. Additionally, such a quantity could be significantly below the fuel tank's nominal capacity if the lower portion 16 were buckled inwardly.

In such cases, an additional consequence of dimensional changes in the fuel tank produced by mechanical or thermal influences is that the location of the vent tube 21 may become altered thereby. As a result, the fuel shut-off level 30 again may be displaced by unpredictable amounts, and the tank cannot be filled to nominal capacity.

Figure 3:
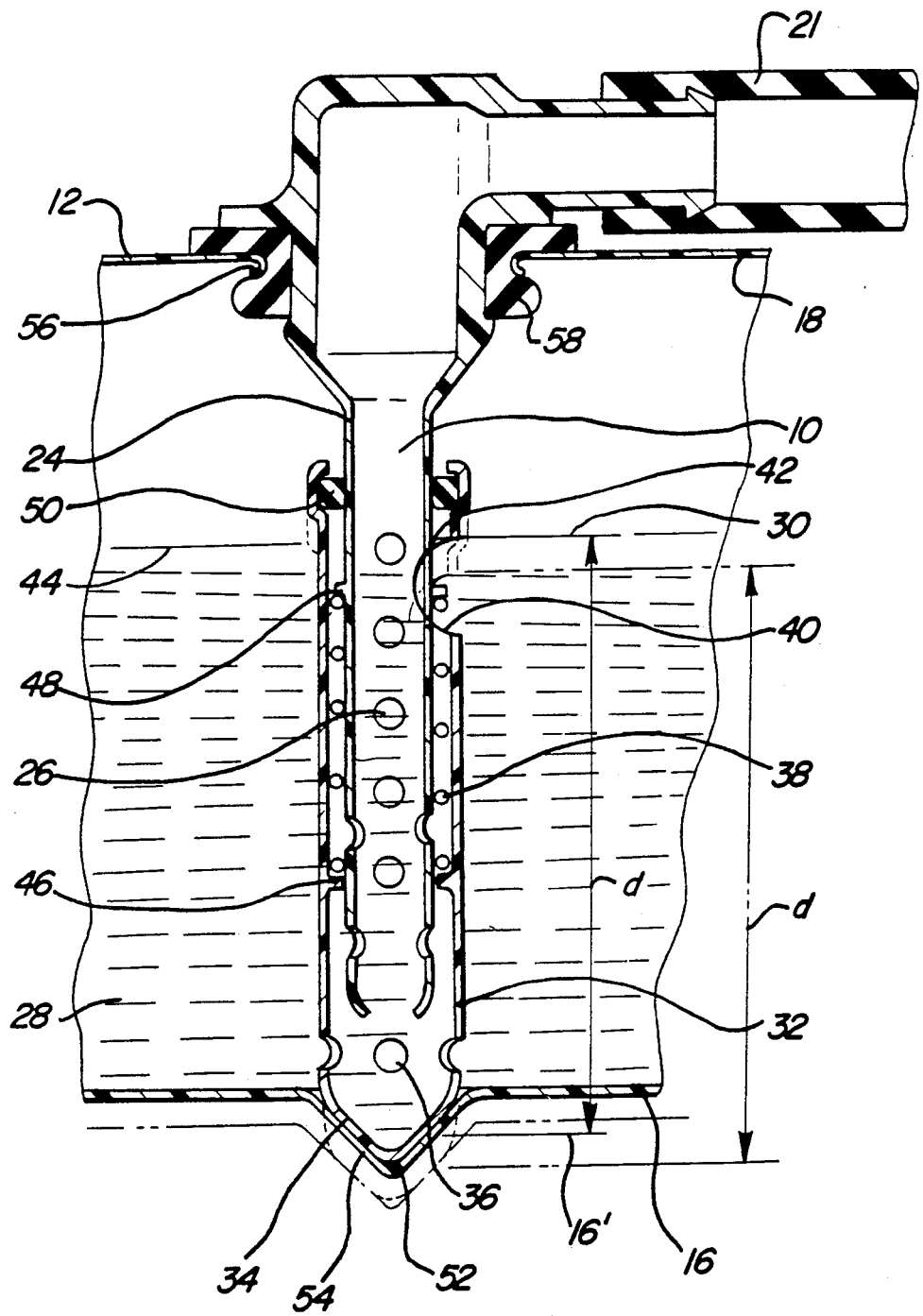
FIG. 3 is a longitudinal cross-sectional view of a vent tube assembly of the present invention.
Figure 4:
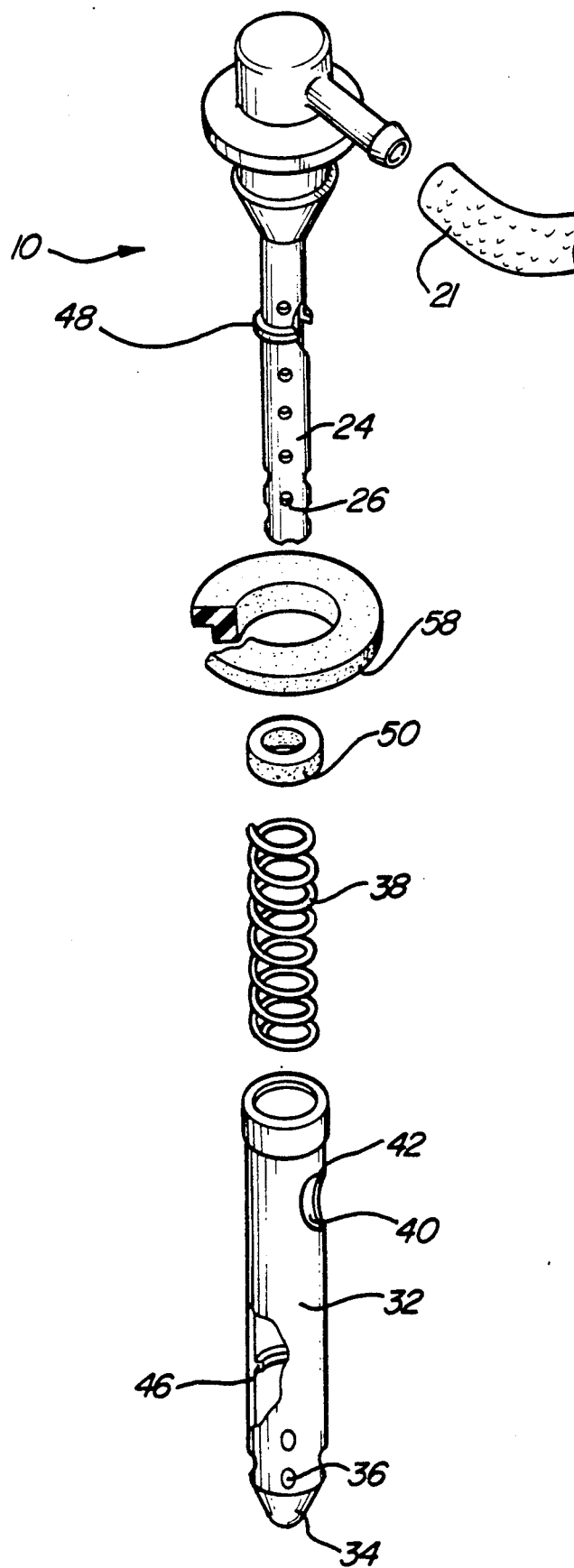
FIG. 4 is a perspective exploded view of the vent tube assembly of the present invention.

Continuing now with primary reference to FIGS. 3 and 4 taken in combination, there is disclosed a vent tube assembly 10 which substantially replaces the conventional vent tube 21 depicted in FIGS. 1-2. The vent tube assembly 10 is coupled with a supply of fuel which is adapted for delivery thereof to the fuel tank 12. As discussed earlier, the fuel tank 12 has a lower portion 16 and an upper portion 18 connected thereto. In fluid communication with the supply of fuel is a pressure-sensitive filler nozzle (not shown) which extends into the filler neck 20 (as best illustrated in FIGS. 1-2). Traditionally, the filler nozzle is adapted for terminating delivery of fuel into the fuel tank 12 when the vapor pressure therein exceeds a shut-off pressure.

In FIGS. 3-4, there is shown an inner vent tube 24 having at least one inner venting port 26 defined therewithin. FIG. 3 illustrates that the inner vent tube 24 extends downwardly through the upper portion 18 of the fuel tank 12. The one or more inner venting ports 26 relieve vapor pressure in the fuel tank 12 as the volume of fuel contained therein increases during replenishment from the fuel supply until the fuel in the fuel tank 12 rises to the fuel shut-off level 30.

Disposed in telescoping relationship with the inner vent tube 24 is an outer vent tube 32. The outer vent tube 32 has a base 34 which is received by the lower portion of the fuel tank 12. To allow free fluid flow therethrough, the outer vent tube 32 is provided with at least one outer venting port defined therein. As shown in FIG. 3, the highest innerventing port 26 is disposed above the highest outerventing port 36 and below the annular seal 50 in order to allow unrestricted vapor relief whenever the fuel level lies below the fuel shut-off level 30.

In order to provide registration between the base 34 of the outer vent tube 32 and the lower portion 16 of the fuel tank 12, means for biasing 38 the outer vent tube 32 toward an extended position is provided. The biasing means 38 such as a coil spring, permits the outer vent tube 32 to move in cooperation with the lower portion 16 of the fuel tank 12.

As a result of the disclosed assembly, the fuel shut off level 30 is determined at a fixed distance above the lower portion 16 of the fuel tank 12, regardless of dimensional changes therein and vehicle attitude. This feature of the invention enables an operator to fill the fuel tank 12 with a reasonably predictable quantity of fuel to its nominal capacity.

Continuing with primary reference to FIGS. 3-4, it can be seen that in practice at least one of the outer venting ports 36 provided in the outer vent tube 32 includes an upper outer vent port with an upper circumferential reference point 42. The fuel shut-off level is defined by an imaginary horizontal plane which extends through the upper circumferential reference point 42.

When the level of fuel 28 lies below the fuel shut-off level, vapor pressure in the space between the fuel surface and the fuel tank 12 is alleviated when the volume of fuel changes. Vapor may escape through any of the outer venting ports 42, along an unobstructed path lying between the outer and inner vent tubes 32,24, and through the inner venting ports 26. The venting path of fuel vapor then continues outwardly from the inner vent tube 24 along the vent tube 21, and ultimately to the ambient atmosphere. However, if the fuel level were to rise above the upper circumferential reference point 42 and the fuel shut-off level 30, any means of escape of vapor pressure to the upper outer venting port 40 is blocked. As a result, an increase in fuel level beyond the upper circumferential reference point 42 will result in an increase in vapor pressure. Consequently, the pressure-sensitive filler nozzle terminates the delivery of fuel into the fuel tank 12.

To support the means for biasing 38, an annular flange 46 extends radially inwardly from the outer vent tube 32. Extending outwardly from the inner vent tube 24 is an annular shoulder 48 which is spaced apart from the annular flange 46, so that the spring 38 extends from the annular flange 46 to the annular shoulder 48 between the inner and outer vent tubes 24,32. In operation, the spring 38 urges the base 34 of the outer vent tube 32 against the lower portion 16 of the fuel tank 12.

An annular seal 50 is disposed between the inner and outer vent tubes 24,32 so that the vent tubes may move axially in relation to each other without the leakage of fuel or fuel vapor around the annular seal 50. As a consequence, the only relief path available to fuel vapor when the rising level of fuel in the fuel tank 12 lies below the fuel shut-off level 30 is through the venting ports 26,36 and along the vent tube 24.

FIG. 3 best shows a means 52 for receiving the base 34 of the outer vent tube 32, which is disposed upon the lower portion 16 of the fuel tank 12. Although other receiving means 52 are possible, FIG. 3 depicts a form of receiving means 52 which comprises a recess 54 defined in the lower portion 16 of the fuel tank 12. As discussed above, the recess 54 cooperatively engages the base 34 of the outer vent tube 32 so that the base 34 is registered in relation to the lower portion 16 of the fuel tank 12.

As the lower portion 16 of the fuel tank 12 becomes distended to a position represented by the reference numeral 16', the base 34 of the outer vent tube 32 moves in registering cooperation therewith. In the example depicted, if the lower portion 16 of the fuel tank 12 is displaced downwardly to 16', then the upper circumferential reference point 42 and hence the fuel shut-off level 30 is displaced downwardly by an equal distance. As a result, the distance D between the base 34 and the fuel cut-off level 30 is constant, despite shape changes in the fuel tank 12 which are manifest by upward or downward movement in the lower portion 16 thereof.

In order to assemble the disclosed invention, the inner vent tube 24 is introduced into the fuel tank 12 through an opening 56 defined in the upper portion 18 thereof. The opening 56 in the fuel tank 12 is substantially axially aligned with the receiving means 52.

Continuing with primary reference to FIG. 3, there is provided a sealing grommet 58 which is inserted between the opening 56 and an angled fitting which is connected to the inner vent tube 24 in order to provide a pressure-tight fit of the vent tube assembly 10 within the fuel tank 12. A leak-proof environment is also provided by the annular seal 50 which may take the form of an "O" ring, and which may assume an oval-shaped cross-section after placement.

Figure 5:
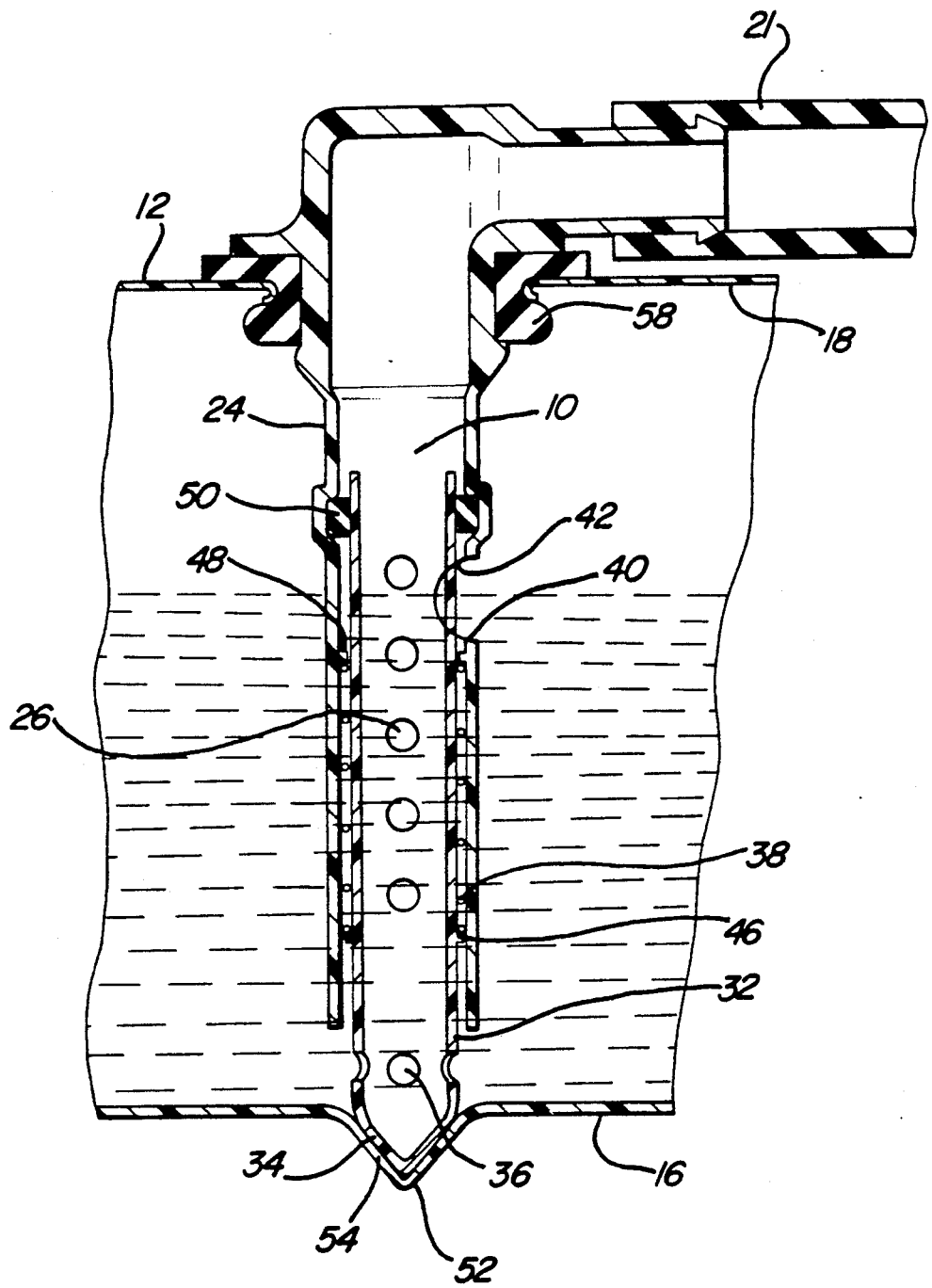
FIG. 5 is a longitudinal cross-sectional view of an alternate embodiment of the vent tube assembly of the present invention.

It will be appreciated that FIG. 3 depicts an embodiment of the vent tube assembly 10 wherein the outer vent tube 32 has a larger diameter than the inner vent tube 24 which extends downwardly from the upper portion 18 of the fuel tank 12. In an alternative embodiment such as that depicted in FIG. 5, the tube which extends downwardly from the upper portion 18 has a larger diameter than the lower tube which it engages telescopically.

In each embodiment, however, to assure an unimpeded fluid flow, the diameter of the upper venting port 40 should be approximately equal to the effective inner diameter of the vent tube 21, thereby presenting no constrictions along the path of fuel vapor flow.

The vent tube 21 may be made of steel or plastic, and may optionally be routed into an upper portion of a filler tube adjacent to the filler neck 20.

In accordance with the invention disclosed herein, the vent tube assembly provides a structure which enables the fuel shut-off level 30 to be determined by a fixed distance above the lower portion 16 of the fuel tank, regardless of dimensional changes therein, and the vehicle attitude. As a result, an operator may fill the fuel tank with a reasonably predictable quantity of fuel to its nominal capacity, and the problems associated with a changing location of the upper circumferential reference point 42 in relation to the lower portion 16 of the fuel tank 12 are avoided.

While the best mode for carrying out the invention has been described in detail, those familiar with the art to which this invention relates will recognize various alternative designs and embodiments for practicing the invention as defined by the following claims.

I claim:

1. A vent tube assembly for use with a supply of fuel adapted for delivering fuel to a fuel tank mounted in a vehicle, the fuel tank having a lower portion and an upper portion connected thereto, the fuel tank being provided with a filler neck into which may extend a pressure-sensitive filler nozzle in fluid communication with the supply, the filler nozzle being adapted for terminating delivery of fuel into the fuel tank when the vapor pressure therein exceeds a shut-off pressure, the vent tube assembly comprising:

an inner vent tube having at least one inner venting port defined therein, said inner vent tube extending generally downwardly through the upper portion of the fuel tank for relieving vapor pressure in the fuel tank as the volume of fuel contained therein increases during replenishment from the supply until the fuel in the fuel tank rises to a fuel shut-off level;

an outer vent tube in telescoping relationship with said inner vent tube, said outer vent tube having a base which is received by the lower portion of the fuel tank and being provided with at least one outer venting port defined therein; and means for biassing said outer vent tube toward an extended position so that said outer vent tube is springingly engaged by said lower portion of the fuel tank, said outer vent tube being adapted to move in cooperation with the lower portion of the fuel tank, whereby the fuel shut-off level is determined at a fixed distance above said lower portion of the fuel tank, regardless of dimensional changes therein and vehicle attitude, thereby enabling an operator to fill the fuel tank with a reasonably predictable quantity of fuel to its nominal capacity.

2. The vent tube assembly of claim 1, wherein said at least one outer venting port provided in said outer vent tube includes an upper outer venting port having an upper circumferential reference point, said fuel shut-off level being defined by a horizontal plane extending through said upper circumferential reference point.

3. The vent tube assembly of claim 1, further comprising:

an annular flange extending radially inwardly from said outer vent tube for supporting said means for biassing;

an annular shoulder extending outwardly from said inner vent tube spaced apart from said annular flange, so that said means for biassing extends between said annular flange and said annular shoulder between said inner and outer vent tubes, and urges said base of said outer vent tube against said lower portion of the fuel tank.

4. The vent tube assembly of claim 1, further comprising:

an annular seal disposed between said inner and outer vent tubes so that said vent tubes may move axially in relation to each other without the leakage of fuel vapor around said seal, and so that the only relief path available to fuel vapor when the rising level of fuel in the tank lies below the fuel shut-off level is through said venting ports.

5. The vent tube assembly of claim 1, further comprising means for receiving said outer vent tube, said means for receiving being disposed upon said lower portion of the fuel tank.

6. The vent tube assembly of claim 5, wherein said means for receiving said outer vent tube comprises a recess defined in said lower portion of the fuel tank, said recess cooperatively engaging said base of said outer vent tube so that said base is registered in relation to said lower portion of the fuel tank, said inner vent tube being introduced into the fuel tank through an opening defined in said upper portion thereof, whereby said recess is substantially axially aligned with said opening.

7. A vent tube assembly for use with a supply of fuel adapted for delivering fuel to a fuel tank mounted in a vehicle, the fuel tank having a lower portion and an upper portion connected thereto, the fuel tank being provided with a filler neck into which may extend a pressure-sensitive filler nozzle in fluid communication with the supply, the filler nozzle being adapted for terminating delivery of fuel into the fuel tank when the vapor pressure therein exceeds a shut-off pressure, the vent tube assembly comprising:

an inner vent tube having at least one inner venting port defined therein, said inner vent tube extending downwardly through the upper portion of the fuel tank for relieving vapor pressure in the fuel tank as the volume of fuel contained therein increases during replenishment from the supply until the fuel in the fuel tank rises to a fuel shut-off level;

an outer vent tube in telescoping relationship with said inner vent tube, said outer vent tube having a base which is received by the lower portion of the fuel tank and being provided with at least one outer venting port defined therein, one of said at least one outer venting ports having a diameter approximately that of said inner vent tube to assure unimpeded fluid flow therethrough;

means for biassing said outer vent tube toward an extended position so that said outer vent tube is springingly engaged by said lower portion of the fuel tank, said outer vent tube being adapted to move in cooperation with the lower portion of the fuel tank, whereby the fuel shut-off level is determined at a fixed distance above said lower portion of the fuel tank, regardless of dimensional changes therein and vehicle attitude, thereby enabling an operator to fill the fuel tank with a reasonably predictable quantity of fuel to its nominal capacity; and wherein said at least one outer venting port provided in said outer vent tube includes an upper outer venting port having an upper circumferential reference point, said fuel shut-off level being defined by a horizontal plane extending through said upper circumferential reference point.

8. The vent tube assembly of claim 7 further comprising:

an annular flange extending radially inwardly from said outer vent tube for supporting said means for biasing; and an annular shoulder extending outwardly from said inner vent tube spaced apart from said annular flange, so that said means for biasing extends between said annular flange and said annular shoulder between said inner and outer vent tubes, and urges said base of said outer vent tube against said lower portion of the fuel tank.

9. The vent tube assembly of claim 8 further comprising:

an annular seal disposed between said inner and outer vent tubes so that said vent tubes may move axially in relation to each other without the leakage of fuel vapor around said seal, and so that the only relief path available to fuel vapor when the rising level of fuel in the tank lies below the fuel shut-off level is through said venting ports.

10. A vent tube assembly for use with a supply of fuel adapted for delivering fuel to a fuel tank mounted in a vehicle, the fuel tank having a lower portion and an upper portion connected thereto, the fuel tank being provided with a filler neck into which may extend a pressure-sensitive filler nozzle in fluid communication with the supply, the filler nozzle being adapted for terminating delivery of fuel into the fuel tank when the vapor pressure therein exceeds a shut-off pressure, the vent tube assembly comprising:

an outer vent tube having at least one outer venting port defined therein, said outer vent tube extending downwardly through the upper portion of the fuel tank for relieving vapor pressure in the fuel tank as the volume of fuel contained therein increases during replenishment from the supply until the fuel in the fuel tank rises to a fuel shut-off level;

an inner vent tube in telescoping relationship with said outer vent tube, said inner vent tube having a base which is received by the lower portion of the fuel tank and being provided with at least one inner venting port defined therein;

means for biasing said inner vent tube toward an extended position so that said inner vent tube is springingly engaged by said lower portion of the fuel tank, said inner vent tube being adapted to move in cooperation with the lower portion of the fuel tank, whereby the fuel shut-off level is determined at a fixed distance above said lower portion of the fuel tank, regardless of dimensional changes therein and vehicle attitude, thereby enabling an operator to fill the fuel tank with a reasonably predictable quantity of fuel to its nominal capacity.

11. A vent tube assembly for use with a supply of fuel adapted for delivering fuel through a pressure-sensitive filler nozzle in fluid communication with the supply to a vehicle for combustion by an engine therein, comprising:

a fuel tank having a lower portion and an upper portion connected thereto, the fuel tank being provided with a filler neck, the pressure-sensitive filler nozzle being adapted for terminating delivery of fuel into the fuel tank when the vapor pressure therein exceeds a shut-off pressure;

an inner vent tube having at least one inner venting port defined therein, said inner vent tube extending downwardly through the upper portion of the fuel tank for relieving vapor pressure in the fuel tank as the volume of fuel contained therein increases during replenishment from the supply until the fuel in the fuel tank rises to a fuel shut-off level;

an outer vent tube in telescoping relationship with said inner vent tube, said outer vent tube having a base which is received by the lower portion of the fuel tank and being provided with at least one outer venting port defined therein;

means for biasing said outer vent tube toward an extended position so that said outer vent tube is springingly engaged by said lower portion of the fuel tank, said outer vent tube being adapted to move in cooperation with the lower portion of the fuel tank, whereby the fuel shut-off level is determined at a fixed distance above said lower portion of the fuel tank, regardless of dimensional changes therein and vehicle attitude, thereby enabling an operator to fill the fuel tank with a reasonably predictable quantity of fuel to its nominal capacity.

12. The vent tube assembly of claim 10 further comprising:

an annular seal disposed between said inner and outer vent tubes so that said vent tubes may move axially in relation to each other without the leakage of fuel vapor around said seal, and so that the only relief path available to fuel vapor when the rising level of fuel in the tank lies below the fuel shut-off level is through said venting ports.

13. The vent tube assembly of claim 10 further comprising:

means for receiving said inner vent tube, said means for receiving being disposed upon said lower portion of the fuel tank.

14. The vent tube assembly of claim 10 further comprising:

a recess defined in said lower portion of the fuel tank, said recess cooperatively engaging said base of said inner vent tube so that said base is registered in relation to said lower portion of the fuel tank, said outer vent tube being introduced into the fuel tank through an opening defined in said upper portion thereof, whereby said recess is substantially axially aligned with said opening.

15. The vent tube assembly of claim 11, wherein said at least one outer venting port provided in said outer vent tube includes an upper outer venting port having an upper circumferential reference point, said fuel shut-off level being defined by a horizontal plane extending through said upper circumferential reference point.

16. The vent tube assembly of claim 11 further comprising:

an annular flange extending radially inwardly from said outer vent tube for supporting said means for biasing; and an annular shoulder extending outwardly from said inner vent tube spaced apart from said annular flange, so that said means for biassing extends between said annular flange and said annular shoulder between said inner and outer vent tubes, and urges said base of said outer vent tube against said lower portion of the fuel tank.

17. The vent tube assembly of claim 11 further comprising:

an annular seal disposed between said inner and outer vent tubes so that said vent tubes may move axially in relation to each other without the leakage of fuel vapor around said seal, and so that the only relief path available to fuel vapor when the rising level of fuel in the tank lies below the fuel shutoff level is through said venting ports.

18. The vent tube assembly of claim 11 further comprising:

means for receiving said outer vent tube, said means for receiving being disposed upon said lower portion of the fuel tank.

19. The vent tube assembly of claim 11 further comprising:

a recess defined in said lower portion of the fuel tank, said recess cooperatively engaging said base of said outer vent tube so that said base is registered in relation to said lower portion of the fuel tank, said inner vent tube being introduced into the fuel tank through an opening defined in said upper portion thereof, whereby said recess is substantially axially aligned with said opening.

20. The vent tube assembly of claim 2, wherein the upper circumferential reference point is disposed at a fixed distance above the lower portion of the fuel tank, regardless of movement of the lower portion of the fuel tank.

* * * * *